United States Patent [19]

Staats

[11] Patent Number: 5,764,930
[45] Date of Patent: Jun. 9, 1998

[54] METHOD AND APPARATUS FOR PROVIDING RESET TRANSPARENCY ON A RECONFIGURABLE BUS

[75] Inventor: Erik P. Staats, Brookdale, Calif.

[73] Assignee: Apple Computer, Inc., Cupertino, Calif.

[21] Appl. No.: 626,129

[22] Filed: Apr. 1, 1996

[51] Int. Cl.$^6$ .................................................. G06F 3/00
[52] U.S. Cl. .................... 395/287; 395/286; 395/200.68
[58] Field of Search ................................. 395/200.15, 800, 395/200, 831, 287, 275, 308, 309, 200.13, 286; 370/63, 60, 85.2, 258

[56] References Cited

U.S. PATENT DOCUMENTS 5,394,556  2/1995  Oprescu .
5,579,486  11/1996  Oprescu et al. .

OTHER PUBLICATIONS

ISO/IEC 13213 ANSI/IEEE Standard 1212, "Information Technology–Microprocessor Systems–Control and Status Registers (CSR) Architecture For Microprocessor Buses", First Edition, pp. 1–125, (Oct. 5, 1994).

Philips Electronics et al, Digital Interface for Consumer Electronic Audio/Video Equipment Draft Version 2.0, IEEE 1394 Trade Association Meeting, pp. 1–47, Part 2–pp. 1–6, (Oct. 1995).

High Performance Serial Bus Working Group of the Microprocessor and Microcomputer Standards Committee, "P1394 Standard for a High Performance Serial Bus", P1394 Draft 8.0v3, pp. 1–364, (Oct. 16, 1995).

Apple Computer, Inc., "Interim Draft, Designing PCI Cards and Drivers for Power Macintosh Computers", A8 Draft–Preliminary Information, pp. 1–372, (Mar. 9, 1995).

Apple Computer, "Inside Macintosh", Nov. 1994, pp. 3-3-3-48, Chapter 3 entitled, SCSI Manager.

"Information Technology–Microprocessor Systems–Control and Status Registers (CSR) Architecture For Microcomputer Buses", IEEE 121210/94, pp. 3–125.

"Standard For A High Performance Serial Bus", IEEE 1394, Oct. 1995, pp. 1–364.

Apple Computer, "Designing PCI Cards and Drivers For Power Macintosh Computers", Mar. 1995, pp. 4–365.

Primary Examiner—Ayaz R. Sheikh
Assistant Examiner—Rupal D. Dharia
Attorney, Agent, or Firm—Blakely, Sokoloff, Taylor & Zafman

[57] ABSTRACT

A computer system includes a plurality of nodes, each having an associated unique identification and bus address, interconnected by point-to-point links. Device data records are maintained in a memory of the computer system wherein node unique identifications, which are bus reset invariant, are associated with corresponding node bus addresses, which are subject to change with bus resets. A driver associated with a source node initiates a bus transaction and specifies a reference identification for the destination node. The reference identification of the destination node is used to access the device data records to obtain the corresponding destination node bus address. When a bus transaction cannot be completed because a bus reset occurs, the device data records are updated to associate the new bus addresses of the nodes with the corresponding node unique identifications. The new destination node bus address is used to complete the bus transaction that was interrupted by the bus reset.

7 Claims, 2 Drawing Sheets

& # x 2 0; # METHOD AND APPARATUS FOR PROVIDING RESET TRANSPARENCY ON A RECONFIGURABLE BUS

FIELD OF THE INVENTION

The present invention relates generally to data communication networks and, more particularly, to a method of completing bus transactions among nodes coupled together via a common interconnect comprising a reconfigurable bus.

BACKGROUND

Digital electronic systems such as computer systems often use a common interconnect to share information between components of the system. For computer systems, the interconnect is typically the computer bus.

One type of system interconnect is described by IEEE Standards Document 1394, entitled Standard For A High Performance Serial Bus (hereinafter the "IEEE 1394 Serial Bus Standard"). A typical serial bus having an IEEE 1394 standard architecture is comprised of a multiplicity of nodes that are interconnected via point-to-point links, such as cables, that each connect a single node of the serial bus to another node of the serial bus. The nodes themselves are uniquely addressable entities which can be independently reset and identified. Nodes are associated with respective components of the computer system and serve as interfaces between the components and the communications links. Each node provides an identification (or configuration) ROM and a standardized set of control registers.

According to the IEEE 1394 Serial Bus Standard, reconfiguration of the serial bus is required when either (1) a new node is joined to the serial bus, or (2) an identified node of the serial bus is removed from the bus. Reconfiguration is required to better ensure that all nodes of the serial bus are notified of the newly connected or disconnected node and that each node has a unique bus address. Typically, the node of the serial bus that detects a new connection or disconnection forces a three-phase configuration process to be performed by asserting a bus reset signal. The three-phase configuration process, consisting of bus initialization, tree identification and node self identification, typically requires several hundred microseconds to perform, during which time the communications of data between nodes is halted.

Bus transactions, such as reads or writes, involve data packet transmissions. Data packets are propagated throughout the serial bus using a number of point-to-point transactions, wherein a node that receives a packet from another node via a first point-to-point link retransmits the received packet via other point-to-point links. A tree network configuration and associated packet handling protocol ensures that each node receives every packet once. During data packet transmissions, a source node may send a data prefix signal (including a speed code, if needed), addresses of the source and destination nodes, a transaction code, a transaction label, a retry code, data, error detection coding, and a packet transmission signal. If a bus reset occurs while a bus transaction is pending, the destination node address transmitted by the source node may no longer be valid. Therefore, it would be desirable to provide a mechanism that allows for bus transactions which were pending prior to a bus reset to be completed transparently from the point of view of an application associated with the source node which initiated the bus transaction.

SUMMARY OF THE INVENTION

It is, therefore, an object of the present invention to enhance the functionality of a computer system comprising a number of nodes coupled together via a common interconnect by providing a method for completing bus transactions in a manner which is transparent to an application associated with the source node which initiated the bus transaction.

This and other objects and features of the present invention are implemented in a computer system in which the various components of the system are interconnected via nodes on a communications bus. Each of the nodes has a unique identification and an initial bus address. A driver associated with a source node initiates a bus transaction which includes the specification of a reference ID for the destination node. The reference ID specified by the source node driver is associated with the destination node's bus address according to a data structure stored in a memory in which node bus addresses are associated with node reference identification parameters. If, during the pendency of the bus transaction, a bus reset occurs, the data structure in which the node reference identifications are associated with the node bus addresses is updated so that the node reference identifications are now associated with the new node bus addresses. The bus transaction is then completed in a manner that is transparent to the driver which initiated the bus transaction, using the destination node's new bus address.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for providing reset transparency on a reconfigurable bus are described. In the following description, many specific details are set forth, such as various computer components and various addressing schemes, in order to provide a thorough understanding of the present invention. It will be appreciated, however, by those skilled in the art that the present invention may be practiced without such specific details. In other instances, well known control structures and coding techniques have not been described in detail in order not to unnecessarily obscure the present invention.

The bus architecture described herein, though described with reference to components for a single computer, in general has a broader scope and could include test and measurement systems, positioning and robotic systems, and audio and video components, for example. The present invention may be applied to any arbitrarily assembled collection of nodes linked together as in a network of electronic devices.

Throughout this description, terms such as "node unique ID", "node reference ID", and "node base address" are used. These terms are not synonomous, however, each node will have an associated unique ID, reference ID and base address.

A node unique ID is a parameter which is created by and read from a node. It is bus reset and system reset invariant. In one embodiment, a node unique ID is a 64-bit number which includes a node vendor ID as described in the IEEE 1394 Serial Bus Standard.

A node reference ID is a parameter which is created by initialization software which runs at the time of system start-up. Node reference IDs are bus reset invariant but are subject to change across system resets. Node reference IDs are parameters used by associated drivers to specify target nodes. At system start-up, initialization software scans the system bus according to techniques well known in the art and locates the various devices attached to the bus and their associated drivers. For each node, the initialization software will call the associated driver to initialize the node. As part of this call, the initialization software will pass a node reference ID to the driver. The driver will store the reference ID for later use whenever the driver needs to communicate with its associated node.

A node base addresses is the logical address of a node within the bus address space. According to an exemplary embodiment, node base addresses include node physical IDs, as generated according to the IEEE 1394 Serial Bus Standard. This is discussed in further detail below. Node base addresses are subject to change across both bus resets and system resets.

Figure 1:
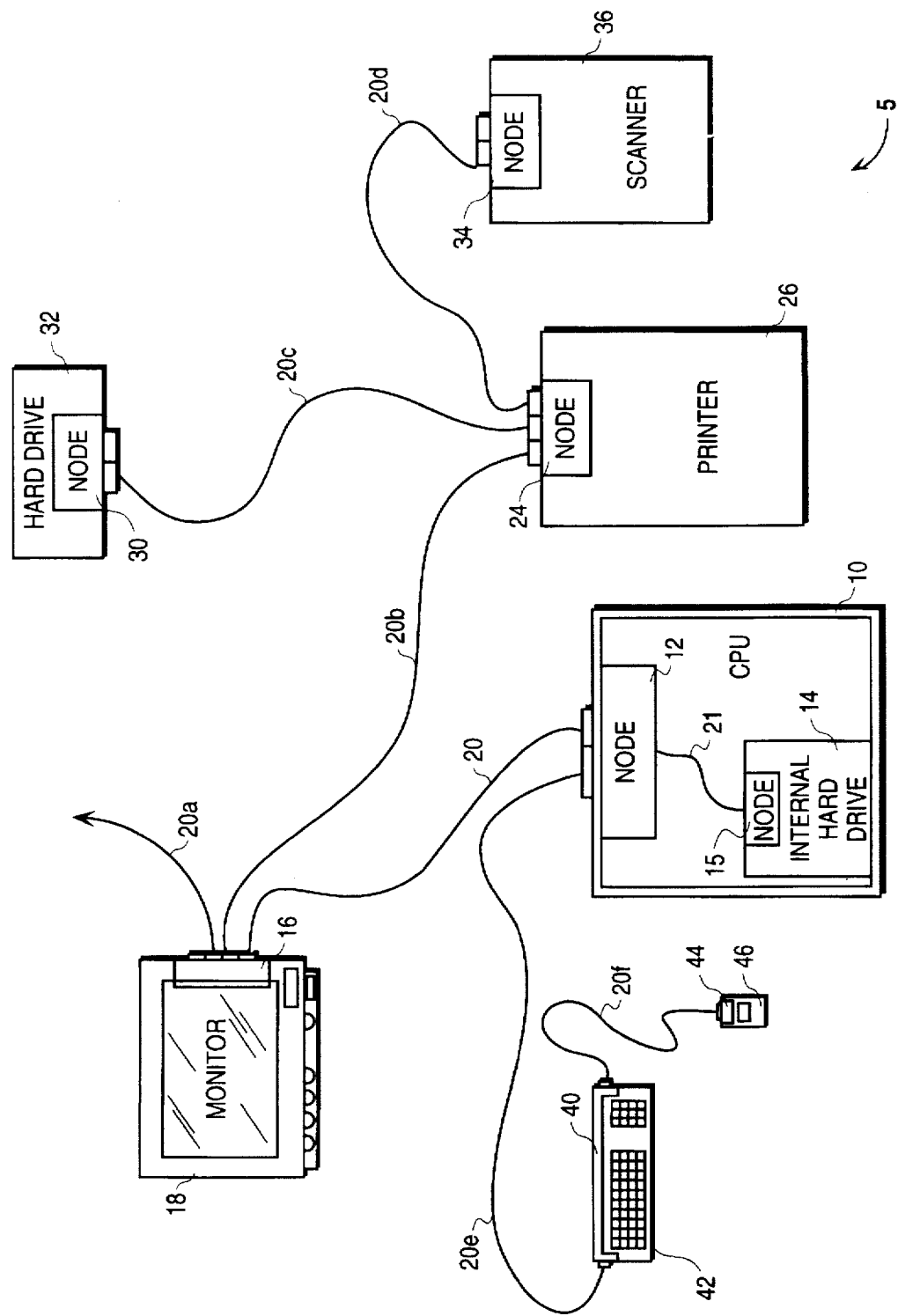
FIG. 1 shows a computer system having a serial bus made up of a number of nodes.

FIG. 1 shows a computer system 5 utilizing a serial bus and incorporating the methods and apparatus of the present invention. For one embodiment, the serial bus may generally be constructed in accordance with the IEEE 1394 Serial Bus Standard. The computer system 5 of FIG. 1 comprises a central processing unit (CPU) 10, a monitor 18, a printer 26, a hard drive 32, a scanner 36, a keyboard 42, and a mouse 46. The CPU 10 includes an internal hard drive 14 and a memory (not shown). Each of the devices of the computer system is coupled to a node of the serial bus. In general, the device to which a node is coupled acts as the "local host" for that node. For example, the CPU 10 is the local host for the CPU node 12; the monitor 18 is the local host for the monitor node 16; the printer 26 is the local host for the printer node 24; the hard drive 32 is the local host for the hard drive node 30; the scanner 36 is the local host for the scanner node 34; the keyboard 42 is the local host for the keyboard node 40; the mouse 46 is the local host for the mouse node 44; and the internal hard drive 14 is the local host for the internal hard drive node 15. It is not necessary for every node to have a local host, nor is it necessary that the local host always be powered.

A point-to-point link such as cable 20 is used to connect two nodes to one another. The CPU node 12 is coupled to internal hard drive node 15 by an internal link 21, to monitor node 16 by cable 20, and to a keyboard node 40 by a cable 20e. The keyboard node 40 is coupled to the mouse node 44 by cable 20f. The monitor node 16 is coupled to the nodes of other peripherals (not shown) by cable 20a and to the printer node 24 by cable 20b the printer node 24 is coupled to the hard drive node 30 by cable 20c and to the scanner node 34 by cable 20d. Each of the cables 20–20f in the internal link 21 may be constructed in accordance with the P1394 Serial Bus Standard and includes a first differential signal pair for conducting a first signal, a second differential signal pair for conducting a second signal, and a pair of power lines.

Each of the nodes 12, 15, 16, 24, 32, 34, 40 and 44 may have identical construction, although some of the nodes, such as mouse node 44, can be simplified because of their specific functions. Thus, the nodes can be modified to meet the needs of the particular local host. For example, each node has one or more ports, the number of which is dependent upon its needs. For example, CPU node 12, as illustrated, has three ports, while the mouse node 44 has only one port. In general, each node will have at least one output register (e.g., a FIFO register) where data packets are assembled prior to transmission on the serial bus.

The serial bus of the computer system 5 may be adapted for use in different types of electronic systems. For example, the serial bus may be used to interconnect the components of an audio/visual electronic system wherein the local hosts may include a video camera, a video recorder, a video monitor, and an audio amplifier.

A computer system, such as computer system 5 shown in FIG. 1, is typically provided with operating system and driver software. This software may be stored in internal hard drive 14 or another suitable storage medium. The operating system generally provides a mechanism for loading driver software for individual devices attached to computer system 5 through nodes 12, 15, 16, 24, 22, 24, 40 and 44. For example, driver software for monitor 18 can be transferred from internal hard drive 14, through nodes 15 and 12, to internal memory associated with CPU 10 for control of monitor 18. Operating system software also provides a pluggable hardware abstraction layer for the nodes to isolate device driver software from the specifics of the nodes. This hardware abstraction layer or architecture allows multiple nodes from multiple sources to work together in a single system.

A typical bus transaction within computer system 5, for example a read transaction, involves a source node (for a read transaction this may be CPU node 12) and a destination node (e.g., hard drive node 30). The source node originates a read transaction when its associated driver communicates a read request. The read request typically includes a destination address and a data length for the read. The source node formats a data packet corresponding to the read request and arbitrates for control of the bus (assuming asynchronous packet transmission). When the arbitration is won, the source node transmits the packet over the bus. At the destination node, the read request is received and an acknowledge is returned. The destination node completes the requested read operation (under the control of its associated driver), arbitrates for the bus, and begins communicating a response. The response includes the requested data as well as a destination address. Of course, the destination address of the read response corresponds to the address of the original source node.

For an embodiment according to the IEEE 1394 Serial Bus Standard, the destination address for a bus transaction must include a 10-bit bus ID and a 6-bit physical ID of the destination node. The bus ID and the physical ID are both logical addresses within the bus address space. The bus ID uniquely specifies a particular bus within a system of multiple interconnected busses. The physical ID is simply the count of the number of times a node passes through the state of receiving self-ID information during the self-identify process following a bus reset or bus initialization before having its own opportunity to send self-ID information. That is, during the self-ID process, the first node sending self-ID packets chooses 0 as its physical ID. The second node chooses 1, and so on. Both the bus ID and the physical ID (and, hence, the destination ID) are subject to change upon each occurrence of a bus reset.

It is apparent then, that successful completion of a bus transaction requires that accurate node logical addresses (hereinafter "base addresses") be used. During bus resets, however, node base addresses are subject to change. Therefore, if a bus reset occurs while a bus transaction is pending, the driver that initiated the transaction will be forced to reinitiate the transaction with an updated base address after the bus has reinitialized and a new topology map has been created.

The present invention provides for reset transparency from the point of view of a driver which initiates a bus transaction as follows. Device data records are created in which for each node, the node base address is associated with a corresponding node unique ID. The device data records are stored in memory and are accessed each time a bus transaction is initiated. As before, a driver associated with a source node will initiate a bus transaction. Rather than specifying a destination address, however, the driver will specify a destination node reference ID. Those skilled in the art will recognize that other software entities (e.g., application programs) are responsible for providing drivers with information regarding the reference IDs of destination nodes. As reference IDs are determined at the time of system start-up, data records of these reference IDs can be maintained for such purposes. Unlike the node base addresses, node reference IDs are not subject to change following a bus reset. In accordance with the present invention, the reference ID passed by the source node's associated driver will be used to obtain a pointer into the previously created device data records. The destination node's base address will then be obtained from the appropriate device data record and the transaction initiated.

If a bus reset occurs while the bus transaction is pending, the device data records are updated to reflect the new node base addresses. Once the device data records have been updated, the present invention allows previously pending bus transactions to be completed without the original source node driver having to reinitiate the transaction.

In particular, a pending transaction is allowed to complete by creating a new transaction packet with the new base address for the former transaction (e.g., a read request). The new base address is obtained from the updated device data records using the reference ID for the destination node previously provided by the source node's associated driver. This reference ID is now used to obtain a pointer into the updated device data records to obtain the new base address of the intended destination node. The new base address can then be incorporated into a new transaction packet without the source node driver having to reinitiate the transaction.

The details of one exemplary embodiment of the present invention for use in a computer system 5 designed according to the IEEE 1394 Serial Bus Standard will now be presented. Upon system start-up, the nodes of the bus are scanned. Scanning processes in general are known in the art and, according to the present invention, will now include providing node reference IDs to the various drivers on computer system 5 using techniques well known in the art (e.g., by creating a device data tree). Bus initialization will also include the creation of device data records. In one embodiment, the device data records are stored in a memory in computer system 5 and comprise a linked list of memory locations. Each node on the bus will have a corresponding device data record of fixed size. An exemplary data structure for a device data record is shown below.

```
DeviceDataRecord
{
    UInt32      uniqueIDHi;
    UInt32      uniqueIDLo;
```

-continued

```
    UInt32      nodeBaseAddress;
    .
    .
    ptr         nextDeviceDataRecord;
}
```

Using a read transaction as an example, the transaction is initiated by a driver associated with the CPU 10. An exemplary read request is shown below.

```
OSStatus  Read (
          AsynchRequestParamsPtr  pAsynchRequestParams);
<-->  pAsynchRequestParams    Pointer to parameter block.
-->   referenceID             ID of destination node of the
                              request.
-->   controlFlags            Flags used to control the
                              request.
<--   status                  Current status of the request.
-->   completionProc          Procedure to call upon
                              completion of the request.
-->   completionProcData      Data to be used by
                              completionProc.
-->   addressHi, addressLo    Device address to read from.
<--   buffer                  Address of buffer to read into.
-->   length                  Amount of data to read.
-->   numRetries              Number of times to retry the
                              request.
```

An exemplary parameter block used by the above read instruction is shown below.

```
struct AsynchRequestParamsStruct
{
    InterfaceParams         interfaceParams;
    UInt32                  addressHi,
                            addressLo;
    Ptr                     buffer;
    UInt32                  length;
    SInt32                  numRetries;
    UInt32                  transferFlags;
};
typedef struct AsynchRequestParamsStruct
                            AsynchRequestParams,
                            *AsynchRequestParamsPtr;
    interfaceParams         Parameters common to all
                            bus interface calls.
    addressHi, addressLo    Destination address offset
                            relative to device associated
                            with referenceID.
    buffer                  Pointer to buffer containing
                            source/destination data.
    length                  Length of data transfer in
                            bytes.
    numRetries              Number of times to retry
                            the request.
    transferFlags           flags used to control data
                            transfer.
```

The above read request attempts to read "length" bytes of data from the device associated with "referenceID" and place them into "buffer". "Read" will retry the request "numRetries" times and return an error if the request is not successful after the given number of retries. In general, the request is asynchronous, although certain "controlFlags" could be set to allow for synchronous transfers. In either case, the procedure pointed to by "completionProc" will be called upon completion (successful or otherwise) of the request. The "completionProc" will be passed "pAsynchRequestParams" and can use "completionProcData" as required.

The destination address specified by "addressHi" and "addressLo" is relative to the base address of the device associated with "referenceID". Read will determine the base address of the intended destination node from "referenceID" using the device data records. Thus, the calling driver need not know the destination ID of the device it wishes to read from.

According to the present invention, the read transaction is recognized by a software entity residing within memory associated with computer system 5. The software entity, hereinafter referred to as a service routine, comprises computer readable instructions which when executed by a processor (e.g., CPU 10), cause the processor to use the reference ID of the read transaction to obtain a pointer into the device data record. The pointer points to the correct device data record. No searching is required. According to the service routine's instructions, the device data records will be maintained with the up-to-date base addresses.

If a bus reset occurs while the read transaction is pending, the bus reset will result in an interrupt being generated. An interrupt handling procedure will disable the CPU's packet transmit operations. The interrupt also acts as a signal to the service routine to update the device data records. As discussed above, this involves scanning the bus for the node unique IDs. However, in order to accomplish this task, the node packet transmissions must be reenabled. This presents a problem. Because the read request is still pending, it is possible that the CPU 10 will still have instructions pending in its execution queue which direct the CPU to fill an output register of CPU node 12 with data for the read transaction packet. Of course, because the bus reset altered the node bus and physical IDs, the addresses associated with this data are invalid. Thus, the output registers of CPU node 12 must be cleared before any bus transmissions can be allowed.

In accordance with the present invention then, the bus reset interrupt provides a signal for the service routine to issue an instruction which causes the CPU 10 to clear the output registers of CPU node 12. This instruction executes at a secondary interrupt level in a preferred embodiment and ensures that the CPU 10 will not transmit data having an invalid address via CPU node 12 following a bus reset.

Once the CPU node 12 output registers have been cleared, the CPU 10 must initiate the bus scan so that all device data records can be updated. To accomplish this task, the service routine must create a priority execution queue. The reason a priority execution queue is required is to ensure that the device data records are updated before the original read transaction is allowed to execute. Recall that the original read request will still be pending in the normal execution queue. If the read transaction were serviced before the device data records are updated, the read may be directed to the wrong address. Thus, the normal execution queue must be disabled until all device data records are updated. The priority execution queue, however, is not disabled.

The service routine therefore places instructions to retrieve a first node unique ID in a priority execution queue. All instructions in the priority execution queue are serviced before any instructions in the normal execution queue are begun. Thus, the service routine instruction to retrieve the first node's unique ID is serviced while the read instruction is still pending in the normal execution queue. When the service routine's instruction returns with the first node's unique ID, the service routine compares the unique ID retrieved with those stored in the device data records. If a match is found, the service routine updates the device data record with the new node base address corresponding to the node unique ID. If no corresponding unique ID is found in the device data records (indicating that the node is a new node), the service routine creates a new device data record and adds the new unique ID and the corresponding node base address to the device data record. The service routine then generates a next instruction to get the next node's unique ID. This new instruction from the service routine is placed in the priority execution queue and it too is serviced before the read request. The second node's unique ID is returned and the process continues until all of the unique IDs for all of the nodes on the bus have been obtained and all device data records have been updated.

Once all the device data records have been updated, the original read request can be serviced. The destination address for the read request will be obtained using the updated device data records. As described above, the service routine maintained a record of the node reference ID for the intended destination node prior to the bus reset. This record, which did not change as a result of the bus reset, is now used as a pointer to the updated device data records and the new destination node base address is obtained. This new base address is appended to the read request and the transaction is allowed to complete.

An exemplary service routine is shown below.

```
Driver:    Calls Read (. . ., referenceID, addressOffset, . . .);
Read:      GetDeviceDataFromReferenceID(
                    Reference ID, &pDeviceData);
                pDeviceData --> {
                                    uniqueID
                                    deviceBaseAddress
                                }
           err = DoRead (. . ., pDeviceData → deviceBaseAddress|
                                    addressOffset, . . .);
           while (err==bus Reconfigured)
                err = DoRead (as above);
Driver:    read is done
- - - - - - - - - - - - - - - - - - - - - - - - - - - - - - - - - - -
BusReset:  For each device on bus
                Read unique ID
                For each Device Data record
                    if (DeviceData uniqueID==unique ID)
                        update DeviceData deviceBaseAddress
                If no matching DeviceData found
                    create new DeviceData record.
```

In the above routine, the bus reset may occur at any time during the execution of the Read. Hence, the dashed line indicates that the above process is not necessarily sequential.

Figure 2:
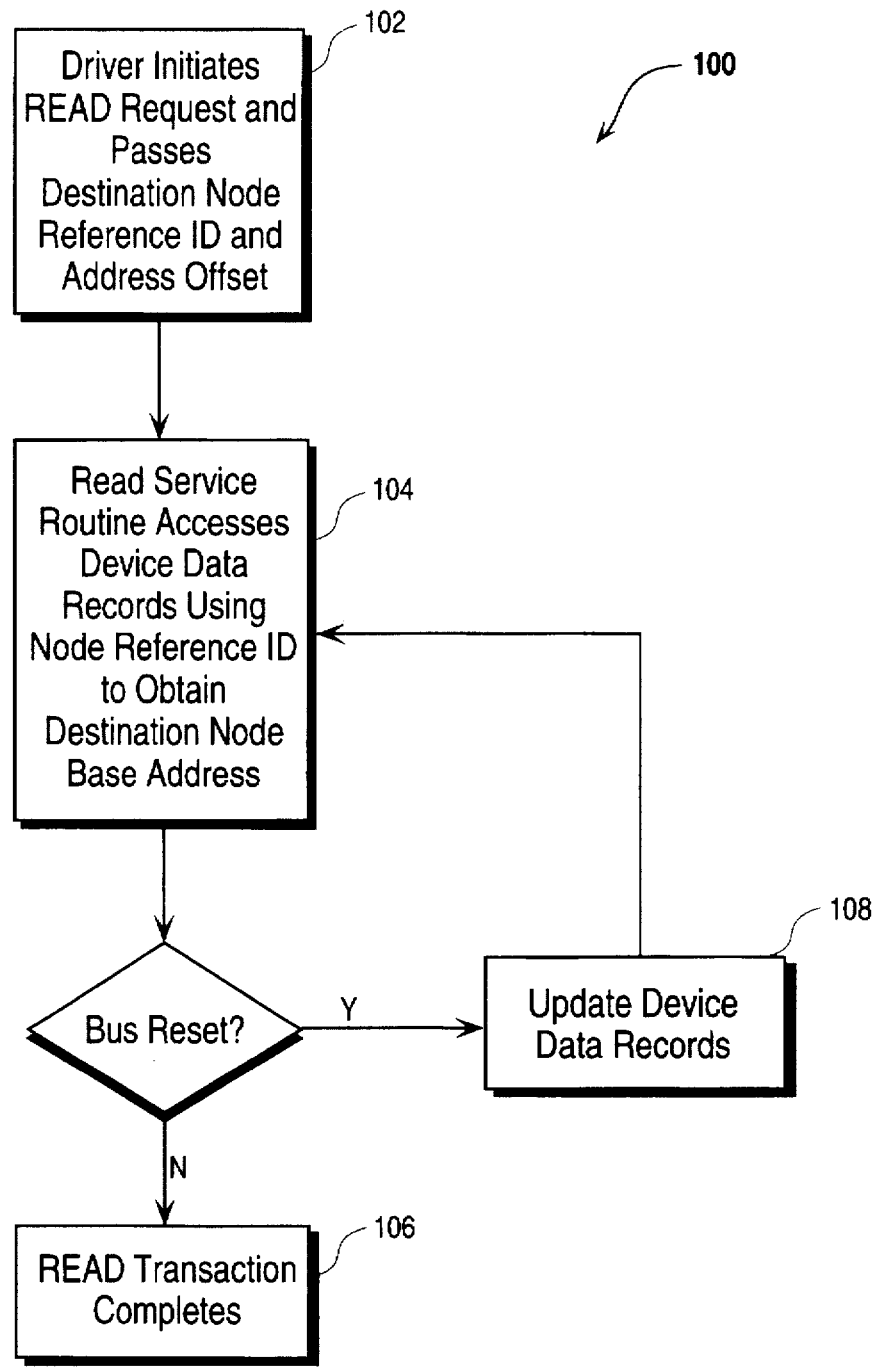
FIG. 2 is a flow diagram showing a bus reset service routine according to one embodiment.

The above routine is more fully described with reference to FIG. 2. FIG. 2 illustrates process 100 which provides reset transparency for driver initiated bus transactions. Process 100 begin with step 102 where a driver associated with a source node initiates a read request and specifies the reference ID of the destination node. The driver also specifies an address offset which corresponds to a memory location associated with the destination node where the required data can be found.

At step 104, the Read service routine recognizes the read request made by the driver and uses the destination node reference ID specified by the driver to access the device data record as described above. The destination node base address, as found in the device data record, which corresponds to the unique ID is then used for the read transaction.

So long as no bus reset occurs while the read transaction is pending, the read transaction is allowed to complete in the normal fashion at step 106. At this point, the driver is informed that the read is complete and the requested data is returned.

If a bus reset does occur while the read transaction is pending (the error condition for the service routine shown above), process 100 transitions to step 108. At step 108, the processor will update the device data record in the fashion described above. When the device data record has been updated, the error condition is removed and the read transaction is completed using the new destination address from the device data record.

The queuing and servicing routines described above are all implemented using programming techniques well known in the art. It will be appreciated that the service routine described above allows the interrupted bus transaction to complete in a manner which is transparent to the driver which initiated it. The driver need not be aware that a bus reset has occurred because the service routine provides that the proper destination address will be recomputed and a new transaction packet will be created using the updated device data records described above.

In the foregoing specification, the invention has been described with reference to specific exemplary embodiments thereof. It will, however, be clear that various modifications and changes may be made thereto without departing from the broader spirit and scope of the invention as set forth in the appending claims. The specification and drawings are, accordingly, to be regarded in an illustrative rather than a restrictive sense.

What is claimed is:

1. A computer implemented method comprising:
   initiating a bus transaction between a source node and a destination node, said bus transaction comprising a bus-reset invariant reference identification associated with said destination node;
   associating said bus-reset invariant reference identification with a corresponding non-reset invariant logical bus address associated with said destination node; and
   completing said bus transaction utilizing said non-reset invariant logical bus address.

2. The method of claim 1 wherein said step of associating comprises:
   using said bus-reset invariant reference identification to access a data structure stored in a computer-readable memory, said data structure comprising said non-reset invariant logical bus address and a bus-reset invariant unique identification associated with said destination node; and
   retrieving from said data structure said corresponding non-reset invariant logical bus address.

3. The method of claim 2 further comprising:
   receiving a bus indication prior to said step of completing said bus transaction;
   replacing said non-reset invariant logical bus address with an updated non-reset invariant logical bus address associated with said destination node in said data structure;
   using said bus-reset invariant reference identification to access said data structure;
   retrieving from said data structure said updated non-reset invariant logical bus address; and
   using said updated non-reset invariant logical bus address in place of said non-reset invariant logical bus address to complete said bus transaction.

4. The method of claim 3 further comprising:
   disabling a local host associated with said source node in response to said bus reset indication.

5. A computer-readable medium comprising: computer readable instructions which, when executed by a processor coupled to a bus, cause said processor to perform the computer implemented steps of:
   (a) initiating a bus transaction comprising a bus-reset invariant reference identification for a destination node coupled to said bus;
   (b) associating said bus-reset invariant reference identification for said destination node with a corresponding non-reset invariant logical bus address for said destination node; and
   (c) completing said bus transaction utilizing said non-reset invariant logical bus address.

6. A computer readable medium as in claim 5 further comprising additional computer readable instructions which, when executed by said processor during said step of associating, cause said processor to perform the computer implemented steps of:
   using said bus-reset invariant reference identification to access a data structure stored in a memory, said data structure comprising a reset invariant unique identification for said destination node and said non-reset invariant logical bus address; and
   retrieving from said data structure said non-reset invariant logical bus address.

7. A computer-readable medium as in claim 6 further comprising computer readable instructions which, when executed by said processor in response to a bus reset indication, cause said processor to perform the computer implemented steps of:
   updating said data structure such that said reset invariant unique identification is associated with an updated non-reset invariant logical bus address for said destination node; and
   completing said bus transaction using said updated non-reset invariant logical bus address in place of said non-reset invariant logical bus address.

* * * * *